C. P. LANDRETH.
PROCESS OF AND APPARATUS FOR TREATING WATER.
APPLICATION FILED SEPT. 13, 1911.
1,095,893.
Patented May 5, 1914.
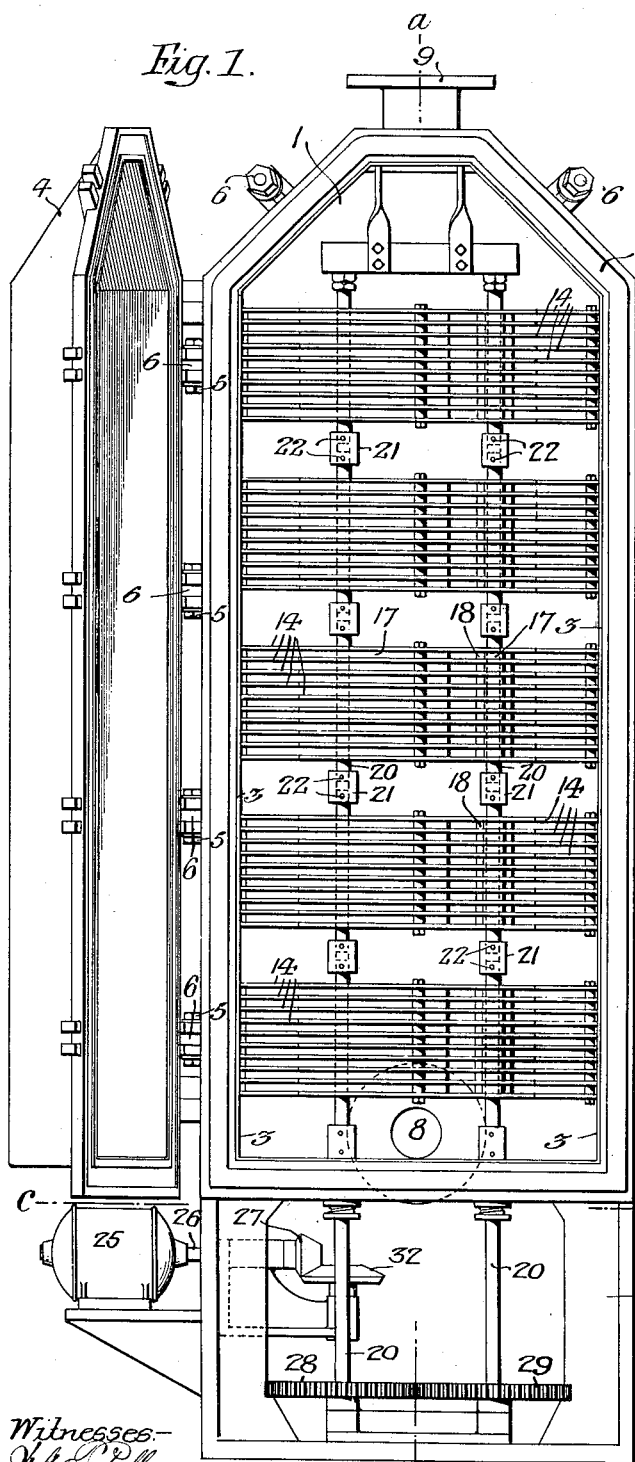
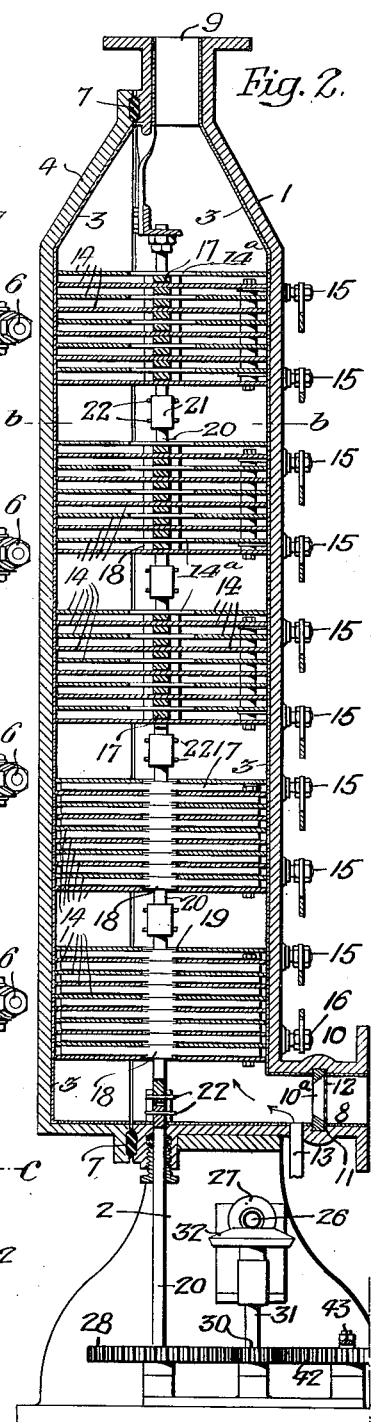

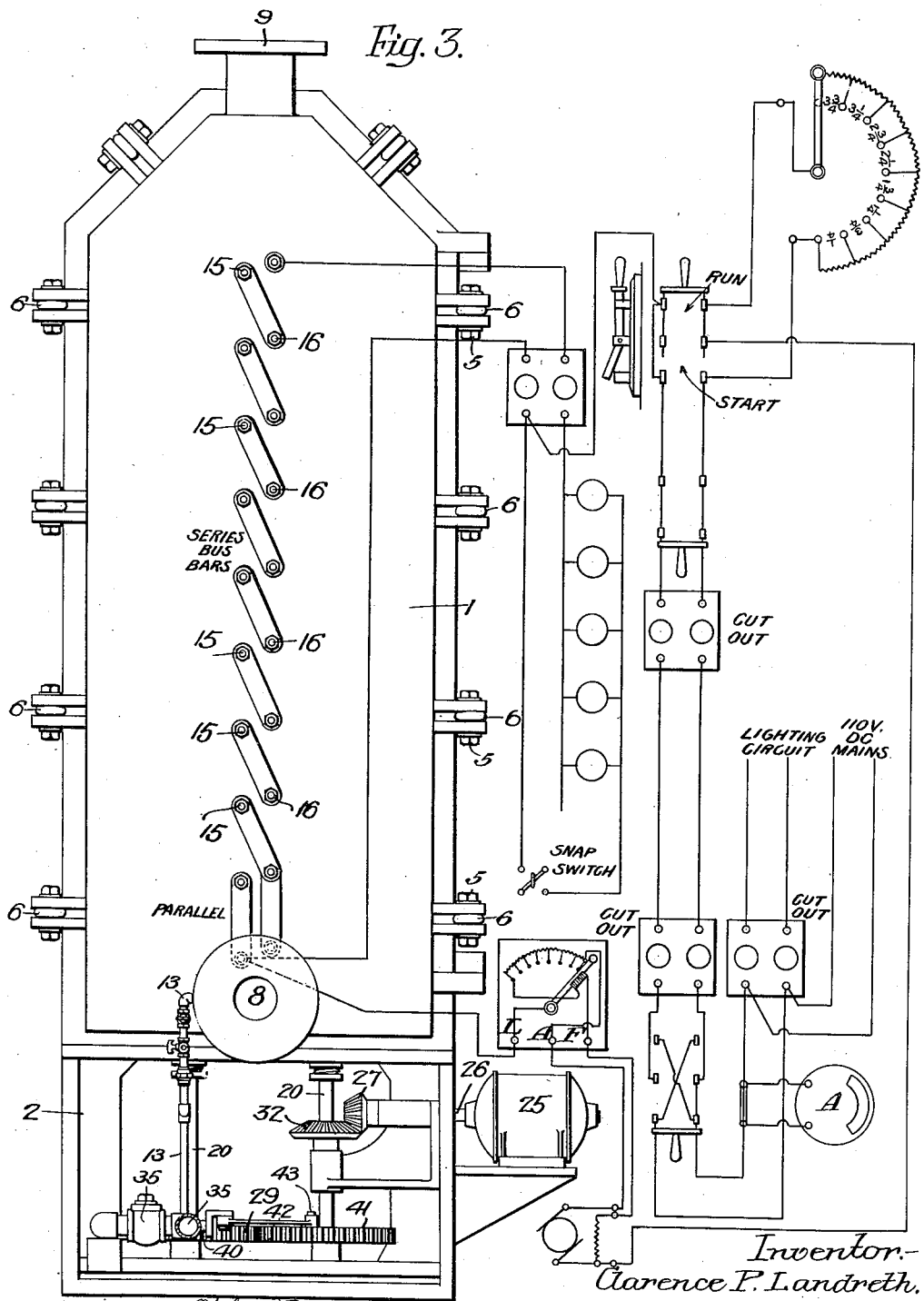

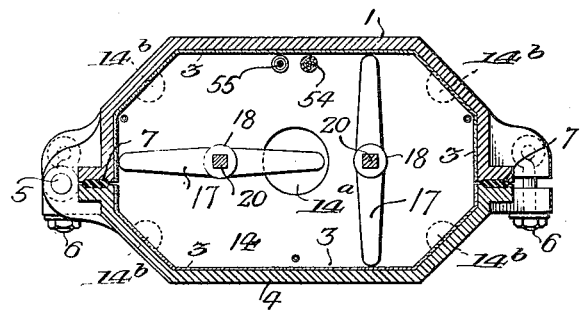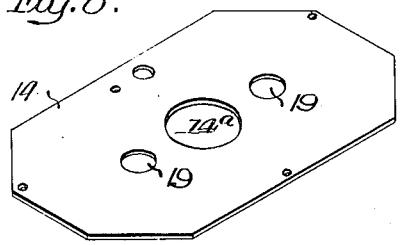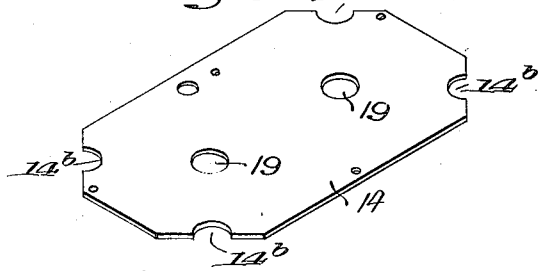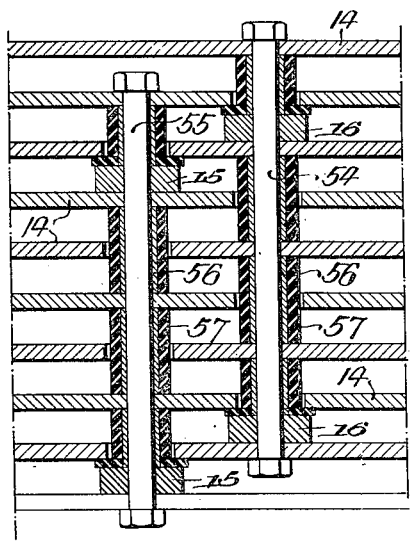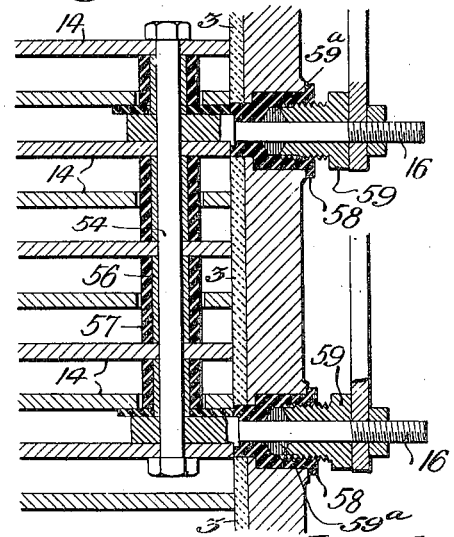

C. P. LANDRETH.
PROCESS OF AND APPARATUS FOR TREATING WATER.
APPLICATION FILED SEPT. 13, 1911.
1,095,893.
Patented May 5, 1914.
4 SHEETS—SHEET 4.
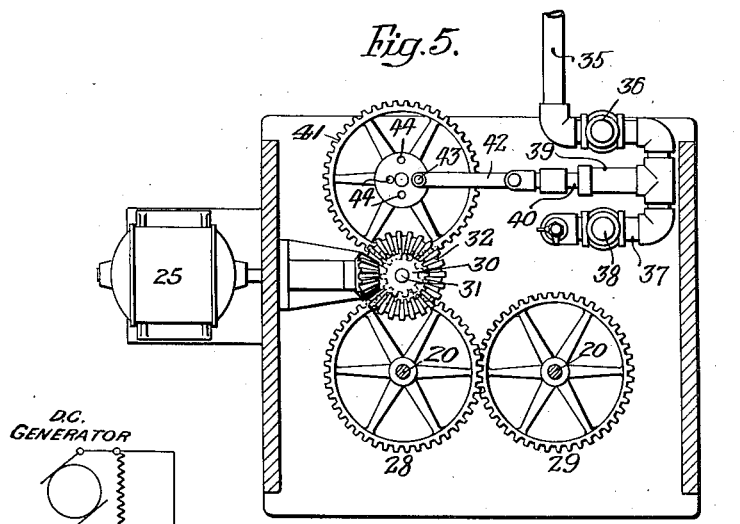
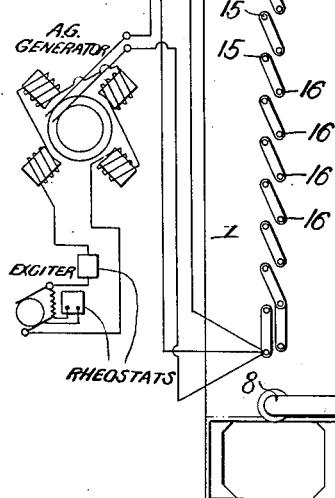
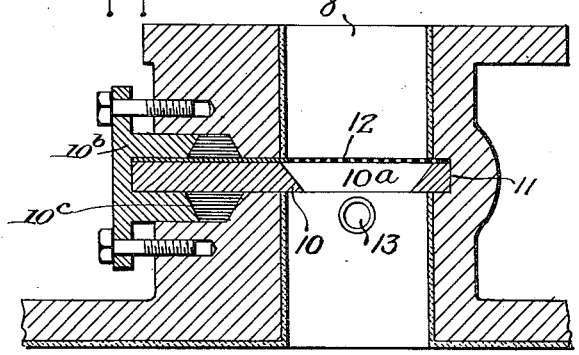
Witnesses—
Inventor:—
Clarence P. Landreth,
by his Attorneys—

UNITED STATES PATENT OFFICE.

CLARENCE P. LANDRETH, OF PHILADELPHIA, PENNSYLVANIA.

PROCESS OF AND APPARATUS FOR TREATING WATER.

1,095,893.  Specification of Letters Patent.  Patented May 5, 1914.

Application filed September 13, 1911. Serial No. 649,060.

*To all whom it may concern:*

Be it known that I, CLARENCE P. LANDRETH, a citizen of the United States, residing in Philadelphia, Pennsylvania, have invented an Improved Process of and Apparatus for Treating Water, of which the following is a specification.

My invention relates to the treatment of water for drinking and industrial purposes, and while it is intended more particularly for use in the treatment of raw water from ordinary water courses to be subsequently employed for drinking and other purposes, it includes the treatment of waste water from factories and other industrial establishments, sewage &c.

The object of my invention is to render the water potable or available for use in the arts for which, in its contaminated condition, it is unfitted.

The process forming the subject of my invention may be carried out with the use of various forms of apparatus, in all of which, however, a plurality of electrodes are arranged in separate banks or sets suitably connected so that in the case of wear, short circuiting, or accident occurring in one bank, the plates comprising the same may be cut out of circuit, remain in circuit, or be removed without interfering with the operation of the apparatus and the process involved.

These and other features of my invention are more fully referred to hereinafter.

One form of apparatus, also forming part of my invention and capable of carrying out my improved process, is shown in the accompanying drawings, in which:

Figure 1, is an elevation of the apparatus in the open position; Fig. 2, is a sectional view on the line *a—a*, Fig. 1; Fig. 3, is a rear elevation of the apparatus, showing also, diagrammatically, the wiring connections; Fig. 4, is a plan view in section on the line *b—b*, Fig. 2; Fig. 5, is a plan view in section on the line *c—c*, Fig. 1; Figs. 6, 7, 8, 9 and 10, are views illustrating details of apparatus which may be employed for carrying out the process forming the subject of my invention, and Fig. 11, is a diagrammatic view of the apparatus and one of the wiring circuits.

In the apparatus which I have devised, I prefer to make the electrodes of iron or a low grade of steel, although electrodes of copper, aluminum, brass, or other alloys, or carbon may also be used. In conjunction with these electrodes I provide paddles or cleansers for the same, rotated by suitable mechanical means, the purpose of which is to keep the surface of the plates free and clear of bubbles and matter deposited from the water or other liquid treated, and at the same time to thoroughly agitate the water or other liquid under treatment, whereby all particles or portions of the same may be brought into contact with the surface of the electrodes, and further to thoroughly mix any oxygen and metallic hydroxid liberated due to decomposition of the water and electrodes, and to thoroughly mix any reagents used; thus insuring that all foreign matter in the water will receive treatment.

In the use of direct current alone, there is a tendency of the same to decompose metallic electrodes, resulting in the formation of a hydroxid which is flocculent and which tends to draw together the particles of impurities in the same.

In order to increase the conductivity of the liquid operated upon and lessen the wear and tear upon the plates, I may use, under some conditions, a coagulating medium such as aluminum sulfate or other coagulent, and an alkali. These materials combined, under the action of a current of electricity, flocculate very rapidly, and a continuous process is made possible by the use of a pressure or mechanical filter attached to the apparatus or arranged to receive all of the water or other liquid leaving the same, with less current consumption and less wear upon the electrodes. In the ordinary method of adding coagulating material, time is an essential factor in order to cause a proper coagulation, which action is hastened by the use of the electrical current. Where it may be desired to use settling tanks, my process facilitates this and hastens the settling.

If water intended for the generation of steam contains scale forming material, soda, lime or some other alkali of a proper character, depending upon the quantity and character of impurities in the water, may be delivered to the raw water supply just prior to its entrance to the treating apparatus. The electrically treated water can be passed directly to a settling tank or, if desired for immediate use, it can be passed through a suitable filter and later delivered to the boiler. The addition of the alkali throws out of solution any dissolved metals. The addition of aluminum sulfate, in conjunction with the alkaline addition, or other media to aid coagulation, causes small particles of the foreign matter present, such as lime, magnesia, silica, &c., which have separated from the water, to be filtered out.

In some cases it may not be necessary or desirable to use electrodes which will decompose, and in such instances I preferably use carbon electrodes of proper character, and obtain the desired coagulation or the presence of a filtering medium within the liquid treated, by means of a coagulating agent such as those referred to above. For some purposes, this arrangement renders the apparatus very effective, and there is no corrosion of the plates.

In the treatment of sewage, water may be added thereto if it is not in a sufficiently liquid state, and when the sewage has been sufficiently thinned it is passed through the apparatus in the same manner as the other water or liquids treated; such sewage material being subjected to agitation by the paddles and to the action of the current of electricity. In connection with the treatment of sewage, I may employ chemicals, which upon decomposition liberate gases in addition to those developed by the electrical action upon the water. For such purpose common salt may be used, which will be decomposed in the apparatus under the action of the electrical current into sodium and chlorin. In employing a solution of common salt, the same is preferably fed into the body of sewage just prior to its entrance into the apparatus, and the decomposition and agitation of such saline solution takes place simultaneously with that of the sewage.

The apparatus which I may employ in carrying out the process forming the subject of my invention includes a series of electrodes so arranged that as the water passes up through the apparatus it is forced to take a circuitous course whereby any material added to it or found in it may be thoroughly mixed; and all particles of the liquid be brought into contact with the electrodes. The water when discharged from the apparatus is delivered through a suitably contracted outlet so that any gases generated and reagents used within the apparatus during the operation of any process may be brought intimately into contact with the foreign matter in the water.

The electrodes, in the form of horizontally disposed plates, are arranged to substantially fill the interior of the casing, and in order that the water or other liquid being treated may readily pass from end to end of the apparatus, one series of plates is provided with apertures, which may be centrally disposed, while the plates of another and alternating series have recesses at their ends forming, with the wall of the casing, openings for the passage of water; such arrangement insuring the most intimate contact of the flowing water with the entire surface of the electrodes. The electrodes are so constructed that the treated liquid is repeatedly forced to pass through contracted outlets; thereby forcing the gases generated, and reagents used, into repeated intimate contact with the impurities. In passing from plate to plate, the water is constantly brought into direct contact with the gases generated by the electrolytic action, as well as with the chemicals present, and is further subjected to agitation by the action of the rotating blades or paddles. Constant agitation of the water is most important, for I have found that it expedites both the electrolytic action and the chemical reactions.

A further feature of the apparatus is the means employed to insure uniform flow of the water and to regulate the rate of such flow, inasmuch as the amount of current employed depends in a large measure upon the rate of flow of the liquid treated. To accomplish this result, I may provide the inlet pipe with an adjustable diaphragm whereby, with a given initial pressure, various rates of flow of the water or other liquid entering the apparatus may be obtained. At this point also I may place a strainer, if it be desired to exclude coarse foreign material.

In carrying my method or process into effect, I purpose at times, to use two electric currents in conjunction; viz., an alternating current and a direct current; the alternating current being kept as high or slightly higher in amperage than the direct current. I have found that by employing this combination of currents, aluminum electrodes can be effectively and successfully used in the treatment of water. The direct current under operating conditions will form hydroxid of alumina which, however, is prevented from sticking to the electrodes by the action of the alternating current and is carried off into the flowing body of water by the blades or paddles. In my process the employment of the scraping blades or paddles enables me to treat many liquids and to use many electrodes which would be otherwise impracticable and unsuitable on account of surface deposit retarding and eventually cutting off the electrolytic action and clogging the apparatus.

As regards the character of electrodes that may be used, my work thus far has shown that plates of different character, which might be otherwise objectionable and deficient, may be employed by using combinations of alternating and direct currents of electricity; it being desirable, however, to observe the electrical character of any material which may be deposited from the water or other liquid treated and to employ plates of a suitable character for use therewith. An important feature, therefore, of my apparatus is the arrangement of means for agitating and thereby diverting the liquid in order that the greatest amount possible may be brought into contact with the surface of the electrodes; such means serving also to keep the plates clean. By this means, the time necessary for treatment of a given quantity of water may be greatly lessened, since there are no quiescent bodies of water adjacent the plates; no bubbles, which tend to form in the decomposition of the water and of certain materials, may remain undisturbed, and all deposit of the materials separated from the liquid treated, as well as all flocculence from the electrodes, is removed.

The placing of the plates horizontally with special provision for the passage of water from one to another across the surfaces of the same, and means for keeping the surfaces clean to insure maximum efficiency, insures thorough contact and avoids clogging the edges of the plates when fibrous substances are present in the water or other liquid being treated.

While my improved process may be carried out in many forms of apparatus, I have devised a structure which appears to be particularly adapted for this work and which is shown in the accompanying drawings.

In these drawings, 1 represents a suitable shell or casing which may be carried by a base 2; such shell or casing being of insulating material, or lined therewith; porcelain being preferred, indicated at 3. This shell may be provided with a door or cover plate 4, preferably hinged at one side as at 5 and secured in place by suitable bolts 6; a gasket 7 of rubber or other suitable material being interposed between the edge surfaces of the cover and casing, each of which may be recessed to receive such gasket. At the lower part of this shell or casing an inlet 8 for liquid is provided, while at the top is an outlet 9. The inlet and outlet pipes are provided with sections of insulating material, rubber hose for instance, indicated at 8$^a$ and 9$^a$, respectively, in Fig. 11 to avoid danger of grounding the circuit. The outlet 9 may be contracted as indicated. At the liquid inlet I provide flow controlling means comprising a diaphragm 10 with an aperture 10$^a$ less in area than the inlet pipe whereby the flow can be cut down when such action becomes desirable. This diaphragm is removable through an aperture 11 in the shell of the inlet pipe; being suitably held in place by a gland 10$^b$ and packed as at 10$^c$ when the apparatus is in use. Diaphragms having apertures of different areas may be employed as desired to control the flow. In addition a screen 12 may be employed, independently of or in connection with the apertured diaphragms. For the admission of chemicals to the liquid flowing through the inlet pipe 8, a pipe 13 may be provided, leading from a suitable source of supply; the chemical entering as indicated by the arrow and commingling with the flowing liquid.

Within the casing are banks of electrodes 14 comprising positive and negative plates alternately disposed and suitably spaced apart, being arranged, in the present instance, in banks of ten plates each, although not limited to this number. Five of these electrodes are negative and five positive, and both sets of the same are suitably connected to terminals 15 and 16, respectively, which may project through the rear wall of the shell or casing; being insulated therefrom and properly connected to a suitable source, or sources, of current.

To provide for the proper passage or circulation of the liquid between the plates 14 and its movement throughout the apparatus, alternate plates are provided with apertures indicated at 14$^a$, while the intermediate plates have their cut-away corners notched or recessed as at 14$^b$, as clearly illustrated in Figs. 8 and 9. By this means, the liquid under treatment is diverted in its flow and caused to contact with the entire surface of the respective plates, insuring the desired electrical treatment.

Between each pair of plates of the several banks, I arrange paddles or scrapers 17 of any suitable material not affected by the electrolytic action taking place; the liquid being treated or any chemicals introduced, and they are preferably of a non-conducting material, which may be fibrous and waterproof, or they may be of hard rubber or equivalent material, substantially filling the space between each pair of said plates, and disposed for engagement with both surfaces thereof. These paddles have hubs 18 substantially fitting apertures 19 in the plates, and they are mounted or strung on shafts 20, which may be square, suitably driven, so as to rotate between the plates; keeping the surfaces of the same clean, and at the same time agitating the water or other liquid under treatment. The shafts carrying these paddles are preferably in short sections connected by suitable collars or coupling 21, which may be secured to the shaft sections by pins or set screws 22, whereby they may be separated when it is desired to remove a bank of the electrodes for any purpose. I provide suitable means to drive these shafts, and in the present instance a motor 25 is employed, having a shaft 26 carrying a bevel gear wheel 27. At the lower ends of the shafts 20 gear wheels 28 and 29 are secured, and one of these gear wheels is driven by a pinion 30, mounted on a vertical shaft 31, to which a bevel pinion 32 is secured and driven by the bevel gear wheel 27, on the shaft 26.

As noted above, it may be desirable to add a coagulent to the water or other liquid being treated, or to add other agents for various purposes, and such additions have a certain relation to the volume of flow of the material under treatment. For this purpose, I may provide a suitable pump designed to introduce the material from a suitable source through the pipe 13 into the inlet connection 8. This pump may be of the ordinary plunger type and may be disposed in the base of the structure.

35 represents an inlet pipe leading from a source of such liquid material, having a check valve 36.

37 represents an outlet pipe having a check valve 38, and between these pipes a pump cylinder 39 is mounted, having a plunger piston 40. To operate this plunger, I provide a gear wheel 41 driven from the pinion 30 and forming a face plate connection for a rod 42, pivotally attached thereto at 43 and connected at its opposite end to said plunger. The gear wheel 42 is provided with a series of apertures 44 providing for the attachment of the connecting rod at different distances from the center of said wheel whereby the stroke of the pump may be regulated as desired. Other forms of pumps, however, may be employed without departing from this feature of my invention.

In Figs. 3 and 11, I have shown diagrammatically the electrical connections for my improved apparatus. The supply wires are indicated at 50 and 51, and the several sets of electrodes may be connected, either in series or in multiple, depending on the results desired and the conditions existing in any particular case. The conditions may be such as to render it desirable to form several circuits, or a combination series and parallel wiring, depending upon the character of the liquid under treatment, its conductivity, velocity of flow, and the amount to be treated. The arrangement of a multiplicity of separate sets or banks of electrodes permits adjustment of current delivery at a fixed voltage; a distinct advantage constituting an important feature of my invention.

The plates of each polarity may be connected together by bolts 54 and 55, and binding posts 15 and 16, respectively, are attached to these bolts, as clearly indicated in Fig. 6. These bolts are in electrical contact with alternating plates, as indicated in the drawings; the other plates of the different polarity being apertured for the reception of metallic collars 56 directly adjacent the bolts, which collars are in turn surrounded by insulating sleeves 57. The binding posts extend through the shell of the vessel, and the apertures for the same have insulating bushings 58, which in turn receive gland nuts 59, with suitable packing 59$^a$ surrounding the said binding posts so as to insure against leakage at such points.

The water discharged from the apparatus will carry in a flocculent state the impurities and metal separated from the plates in the form of an hydroxid. Such water therefore must be filtered, or be allowed to settle and then decanted, before it is ready for use. In either method of after treatment, whether by filtration or decantation, it may be desirable to provide means for hastening the precipitation of the flocculent material which must be removed. I propose to aid this result by interposing in the discharge pipe of the apparatus a tubular electromagnet 60 of large intensity, as shown in Fig. 11, having a non-magnetic lining, so that the liquid delivered from the apparatus will have the flocculent material in condition to separate very quickly; either by settling or filtration.

The whole apparatus is preferably interposed between the insulating sections 8$^a$ and 9$^a$, which may be sections of rubber hose or pipe made of other suitable insulating material disposed in the inlet and outlet mains. Such insulating sections prevent the apparatus grounding or being affected by a grounded circuit extraneous to the apparatus, and the solenoid may be interposed between the insulating section 9$^a$, and a supplemental insulating section 61, in the discharge pipe.

In Figs. 3 and 11, I have shown diagrams of wiring connections for my improved water treating apparatus. Fig. 3, shows the main connections for the direct and alternating current generators, together with the connections between the apparatus and a direct current generator which I have employed in actual practice. Fig. 11, shows the solenoid connections. In lieu of the lamps, I may employ a rheostat to maintain uniform amperage.

I claim:

1. The process of treating liquid to produce a precipitant including foreign matter to be removed therefrom, which consists in passing such liquid continuously between plates of aluminum in circuit with sources of electricity and contained in a receptacle closed except for contracted inlet and outlet, continuously agitating such liquid whereby motion independent of the force of its flow is imparted thereto, and simultaneously passing alternating and direct currents of electricity between said plates and through the bodies of flowing liquid in contact therewith.

2. The process of treating water, which consists in passing such water continuously between plates of aluminum in circuit with sources of electricity and contained in a receptacle closed except for contracted inlet and outlet, continuously agitating such water whereby motion independent of the force of its flow is imparted thereto, and simultaneously passing alternating and direct currents of electricity between said plates and the bodies of flowing water in contact therewith, such agitation serving to carry away from the electrodes and into the current any foreign matter decomposed by the electrolytic action whereby the electrodes are kept clean and fresh bodies of water are constantly brought into contact with the same.

3. In apparatus for the treatment of liquid, the combination of a closed receptacle forming part of a conduit, a plurality of electrodes disposed within said receptacle and connected in circuit with a source of electric current, rotatable elements disposed between and adjacent to said electrodes, means for forcing liquid under pressure through said receptacle, and means for driving said rotatable elements whereby the liquid adjacent the electrodes is continuously agitated and motion independent of the force of its flow imparted thereto so that foreign matter decomposed by electrolytic action is carried into the current and fresh bodies of untreated liquid are brought into contact with the electrodes.

4. In apparatus for the treatment of liquid, the combination of a receptacle forming part of a conduit, a plurality of sets of electrodes disposed within said receptacle and connected in circuit with a source of electric current, said sets of electrodes being independently removable, rotatable elements disposed between and adjacent to said electrodes, means for forcing liquid under pressure through said receptacle, and means for driving said rotatable elements whereby the liquid adjacent the electrodes is continuously agitated and motion independent of the force of its flow imparted thereto so that foreign matter decomposed by electrolytic action is carried into the current and fresh bodies of untreated liquid are brought into contact with the electrodes of the several sets.

5. In apparatus for the treatment of water, the combination of a receptacle forming part of a conduit, a plurality of aluminum plates disposed within said receptacle and connected in circuit with sources of electric current, rotatable elements disposed between and adjacent to said plates, means for forcing water under pressure through said receptacle, and means for driving said rotatable elements whereby the water adjacent the plates is continuously agitated and motion independent of the force of its flow imparted thereto so that foreign matter decomposed by electrolytic action is carried away from the electrodes and into the current and fresh bodies of untreated water are brought into contact with the plates.

6. In apparatus for the treatment of liquid, the combination of a receptacle forming part of a conduit, a plurality of aluminum plates disposed within said receptacle and connected in circuit with sources of alternating and direct currents of electricity, rotatable sweeping elements of non-conducting material disposed between and adjacent to said plates, means for forcing liquid under pressure through said receptacle, a sectional shaft operatively connected to said rotatable elements, means for driving said sectional shaft whereby the elements are rotated to continuously agitate the liquid adjacent the plates and impart motion thereto independent of the force of its flow so that foreign matter decomposed by electrolytic action is carried into the current and fresh bodies of untreated liquid are permitted to come in contact with the plates.

7. In apparatus for the treatment of water, the combination of a receptacle forming part of a conduit, a plurality of independent and independently separable sets of aluminum plates disposed within said receptacle and connected in circuit with sources of electric current, rotatable elements of non-conducting material disposed between and adjacent to said plates, means for forcing water under pressure through said receptacle, vertical shafts operatively connected to said rotatable elements for driving the same whereby the water between and adjacent to the plates is continuously agitated and motion independent of the force of its flow imparted thereto so that foreign matter decomposed by electrolytic action is carried into the current and fresh bodies of untreated water are permitted to come in contact with the plates.

8. In apparatus for the treatment of flowing liquid by electricity, the combination of a closed casing forming part of a conduit and providing for the continuous passage of said liquid in an upward direction therethrough, a series of electrodes in said casing connected together in sets and in circuit with a source of electrical energy, and means for continuously agitating the liquid between and adjacent to said electrodes whereby motion independent of the force of its flow is imparted to said liquid, such flow bringing fresh bodies of liquid into contact with the surfaces of said electrodes and the agitation of the liquid serving to free the plates from bubbles of gas and to carry into the current all foreign matter produced by decomposition.

9. In apparatus for the treatment of flowing water by electricity, the combination of a closed casing forming part of a conduit and providing for the continuous passage of said water therethrough, a series of aluminum plates in said casing connected together in sets and in circuit with sources of electrical energy, blades disposed between said plates, shafts carrying said blades, and means for driving said shafts to impart motion to said blades for continuously agitating the water between and adjacent to said plates whereby motion independent of the force of its flow is imparted to said water, such flow bringing fresh bodies of water into contact with the surfaces of said plates and the agitation of the liquid serving to free the plates from bubbles of gas and to carry into the current all foreign matter produced by decomposition.

10. The combination, in apparatus for the electrical treatment of flowing water, of a closed casing forming part of a conduit, a series of sets of electrodes therein and in circuit with a source of electrical energy, rotatable members of insulating material disposed between said electrodes for continuously agitating the water whereby motion independent of the force of its flow is imparted thereto so that the treated water is rapidly carried into the current and fresh bodies brought into contact with the electrodes, and means for driving said rotatable members.

11. The combination, in apparatus for the electrical treatment of flowing water, of a closed casing forming part of a conduit, a series of sets of electrodes therein and in circuit with a source of electricity, movable elements disposed between and substantially in contact with pairs of said electrodes, means for rotating said elements to keep the water in constant motion independently of the force of its flow so as to constantly carry into the current the treated portions thereof and bring fresh bodies into contact with the electrodes, and means for mechanically connecting said electrodes together.

12. In apparatus for the treatment of flowing liquid by electricity, the combination of a closed casing forming part of a conduit, means for introducing governed quantities of liquid into said casing, means for introducing chemical reagents into the flowing liquid, a series of electrodes in said casing connected together in sets and in circuit with a source of electricity, rotatable means for keeping the liquid in constant agitation whereby motion independent of the force of its flow is imparted to said liquid so as to carry into the current the treated portions thereof, a contracted discharge outlet carried by said casing for the treated liquid, and means driving said agitating means.

13. In apparatus for the treatment of flowing liquid by electricity, the combination of a closed casing forming part of a conduit, a series of sets of electrodes therein suitably connected to sources of electrical energy, a series of rotatable blades disposed between the electrodes and substantially contacting therewith for continuously agitating the liquid whereby motion independent of the force of its flow is imparted thereto, a pair of shafts carrying said blades, and means for simultaneously rotating said shafts, said blades sweeping the greater portion of the surfaces of said plates.

In testimony whereof, I have signed my name to this specification, in the presence of two subscribing witnesses.

CLARENCE P. LANDRETH.

Witnesses:
 MURRAY C. BOYER,
 JOS. H. KLEIN.